(12) United States Patent
Piednoel

(10) Patent No.: US 12,515,681 B2
(45) Date of Patent: Jan. 6, 2026

(54) SYSTEM ON CHIP AUTOMOTIVE SAFETY MONITORING

(71) Applicant: Mercedes-Benz Group AG, Stuttgart (DE)

(72) Inventor: Francois Piednoel, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 165 days.

(21) Appl. No.: 18/208,189

(22) Filed: Jun. 9, 2023

(65) Prior Publication Data

US 2024/0409106 A1    Dec. 12, 2024

(51) Int. Cl.
| | |
|---|---|
| *B60W 50/02* | (2012.01) |
| *B60W 50/023* | (2012.01) |
| *B60W 50/04* | (2006.01) |
| *G06F 11/07* | (2006.01) |

(52) U.S. Cl.
CPC ...... *B60W 50/0205* (2013.01); *B60W 50/023* (2013.01); *B60W 50/04* (2013.01); *G06F 11/0739* (2013.01); *G06F 11/0754* (2013.01)

(58) Field of Classification Search
CPC ............. G06F 11/0736; G06F 11/0739; G06F 11/0754; G06F 11/076; G06F 11/0793; G06F 11/2025; G06F 11/2023; G06F 11/2028; B60W 50/02; B60W 50/0205; B60W 50/0225; B60W 50/023; B60W 50/029; B60W 50/04; B60W 50/045; B60W 2050/021; B60W 2050/0292; B60W 2050/041; G05B 23/0289; G05B 23/0291

See application file for complete search history.

(56) References Cited

U.S. PATENT DOCUMENTS

| | | | |
|---|---|---|---|
| 7,933,850 B1 * | 4/2011 | Urmanov | G06F 11/0751 706/20 |
| 10,445,197 B1 * | 10/2019 | Harpreet | G06F 11/2023 |
| 10,992,257 B2 | 4/2021 | Narla | |
| 11,144,027 B2 | 10/2021 | Capodanno | |
| 11,269,799 B2 | 3/2022 | O'Bleness | |

(Continued)

FOREIGN PATENT DOCUMENTS

| | | |
|---|---|---|
| CN | 110879546 A | 3/2020 |
| CN | 112149369 A | 12/2020 |

(Continued)

OTHER PUBLICATIONS

International Search Report with Written Opinion of the International Searching Authority for the Application No. PCT/EP2024/059477 mailed Jul. 8, 2024.

(Continued)

*Primary Examiner* — Gabriel Chu
(74) *Attorney, Agent, or Firm* — Mahamedi IP Law LLP

(57) ABSTRACT

A method of runtime program verification receives, through a preemptive mechanism of an operating system running on an external system, recent values for a set of system health indicators for the external system. The recent values are compared to calibrated values for the set of system health indicators, and normal operation of the external system is verified based on whether the comparison of the recent values to the calibrated values are within predetermined error thresholds.

20 Claims, 5 Drawing Sheets

(56) References Cited

U.S. PATENT DOCUMENTS

| | | | |
|---|---|---|---|
| 11,360,846 | B2 | 6/2022 | Boschi |
| 11,388,054 | B2 | 7/2022 | Bernat |
| 11,410,266 | B2* | 8/2022 | Matam ................ G06F 13/4027 |
| 11,565,606 | B2 | 1/2023 | Kazuno |
| 11,573,856 | B1 | 2/2023 | Ditty |
| 11,636,063 | B2 | 4/2023 | Hung |
| 12,199,838 | B2 | 1/2025 | Binet |
| 12,229,079 | B2 | 2/2025 | Piednoel |
| 12,276,963 | B2 | 4/2025 | Raj |
| 2008/0163255 | A1* | 7/2008 | Munoz ................ G06F 11/2028 719/318 |
| 2010/0162383 | A1* | 6/2010 | Linden ................ H04L 67/142 726/13 |
| 2016/0306700 | A1* | 10/2016 | Heil ................ G06F 11/0793 |
| 2016/0357647 | A1* | 12/2016 | Shirai ................ G06F 11/20 |
| 2019/0391855 | A1 | 12/2019 | Bernat |
| 2020/0017114 | A1 | 1/2020 | Santoni et al. |
| 2020/0125722 | A1 | 4/2020 | Iyer et al. |
| 2021/0019214 | A1* | 1/2021 | Kim ................ G06F 11/0772 |
| 2021/0182132 | A1* | 6/2021 | Chen ................ G06F 11/0736 |
| 2021/0192867 | A1 | 6/2021 | Fang |
| 2021/0240560 | A1* | 8/2021 | Ping ................ G06F 3/0665 |
| 2022/0114028 | A1 | 4/2022 | Peng et al. |
| 2022/0283971 | A1 | 9/2022 | Lee |
| 2023/0024607 | A1* | 1/2023 | Choi ................ G06F 11/3055 |
| 2023/0032305 | A1 | 2/2023 | Krishnani |
| 2023/0036117 | A1 | 2/2023 | Krishnani |
| 2023/0063601 | A1 | 3/2023 | Upadhyay |
| 2023/0176577 | A1 | 6/2023 | Ditty |
| 2023/0342161 | A1 | 10/2023 | Binet |
| 2024/0089181 | A1* | 3/2024 | Binet ................ G06F 11/202 |
| 2024/0375670 | A1 | 11/2024 | Piednoel |
| 2024/0378090 | A1 | 11/2024 | Piednoel |
| 2025/0042418 | A1 | 2/2025 | Piednoel |

FOREIGN PATENT DOCUMENTS

| | | |
|---|---|---|
| CN | 114780227 A | 7/2022 |
| CN | 115688093 A | 2/2023 |
| KR | 20210015472 A | 2/2021 |

OTHER PUBLICATIONS

International Search Report and Written Opinion issued by the International Searching Authority on Nov. 15, 2025 for PCT Application No. PCT/EP2024/025229. 10 pages.

Abella, Jaume et al. "Envisioning a Safety Island to Enable HPC Devices in Safety-Critical Domains" Hardware and Architecture (cs.AR), Cornell University, submitted Jul. 21, 2023. 9 pages.

Ma, Yenai et al "Tap-2.5D: A Thermally-Aware Chiplet Placement Methodology for 2.5D Systems" ResearchGate, Conference Paper, Feb. 2021. 7 pages.

Avani, Dave, "A Study of AI-Based Smart Chiplets and Interconnects for Vehicles", North American Jorunal of Engineeribg; Research, vol. 2, No. 4, Nov. 2021, Accessed: Nov. 20, 2025 [Online]. Available: https://najer.org/najer/article/view/64.

Guangbao, Shan et al. "Architecture of Computing System Based on Chiplet" Micromachines: Jan. 29, 2022; found online at https://doi.org.10.3390/mi13020205.

\* cited by examiner

US 12,515,681 B2

SYSTEM ON CHIP AUTOMOTIVE SAFETY MONITORING

BACKGROUND

Universal Chiplet Interconnect Express (UCIe) provides an open specification for an interconnect and serial bus between chiplets, which enables the production of large system on chip (SoC) packages with intermixed components from different silicon manufacturers. Autonomous vehicle computing systems may operate using chiplet arrangements that follow the UCIe specification. One goal of creating such computing systems is to achieve the robust safety integrity levels of other important electrical and electronic (E/E) automotive components of the vehicle.

SUMMARY

An on-board, vehicle computing system is described herein that includes a system on chip (SoC) with a number of specialized chiplets to take data from sensors in the vehicle and make decisions for autonomous driving in a functionally safe manner.

As used herein, a system on chip (SoC) is an integrated circuit that combines multiple components of a computer or electronic system onto a single chip, providing a compact and efficient solution for a wide range of applications. The main advantage of an SoC is its compactness and reduced complexity, since all the components are integrated onto a single chip. This reduces the need for additional circuit boards and other components, which can save space, reduce power consumption, and reduce overall cost. The components of an SoC are often referred to as chiplets, which are small, self-contained semiconductor components that can be combined with other chiplets to form the SoC. Chiplets are designed to be highly modular and scalable, allowing for the creation of complex systems from smaller, simpler components and are typically designed to perform specific functions or tasks, such as memory, graphics processing, or input/output (I/O) functions. They are usually interconnected with each other and with a main processor or controller using high-speed interfaces. Chiplets offer increased modularity, scalability, and manufacturing efficiency compared to traditional monolithic chip designs, as well as the ability to be tested individually before being combined into the larger system.

In various implementations, a computer monitoring system receives, through a preemptive mechanism of an operating system running on an external system, recent values for a set of system health indicators for the external system. The recent values are compared to calibrated values for the set of system health indicators, and normal operation of the external system is verified based on whether the comparison of the recent values to the calibrated values are within predetermined error thresholds.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
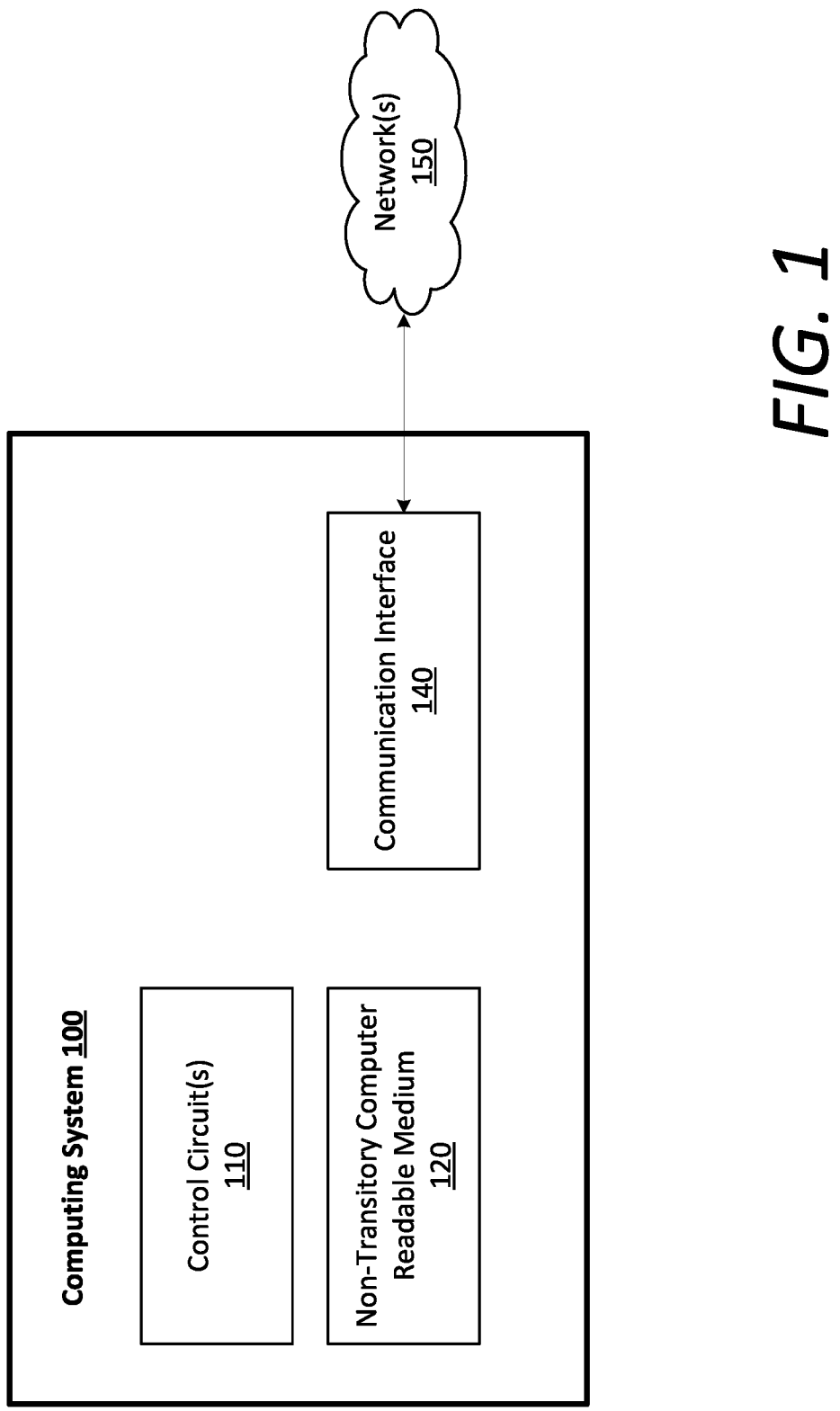
FIG. 1 is a block diagram depicting an example computing system in which embodiments described herein may be implemented, in accordance with examples described herein.

In experimentation and controlled testing environments, system redundancies and automotive safety integrity level (ASIL) ratings for autonomy systems are not typically a priority consideration. As autonomous driving features continue to advance (e.g., beyond Level 3 autonomy), and autonomous vehicles begin operating more commonly on public road networks, the qualification and certification of E/E components related to autonomous operation of the vehicle will be advantageous to ensure operational safety of these vehicles. Furthermore, novel methods for qualifying and certifying hardware, software, and/or hardware/software combinations will also be advantageous in increasing public confidence and assurance that autonomous driving systems are safe beyond current standards. For example, certain safety standards for autonomous driving systems include safety thresholds that correspond to average human abilities and care. Yet, these statistics include vehicle incidences involving impaired or distracted drivers and do not factor in specified time windows in which vehicle operations are inherently riskier (e.g., inclement weather conditions, late night driving, winding mountain roads, etc.).

Automotive safety integrity level (ASIL) is a risk classification scheme defined by ISO 26262 (the functional safety for road vehicles standard), and is typically established for the E/E components of the vehicle by performing a risk analysis of potential hazards, which involves determining respective levels of severity (i.e., the severity of injuries the hazard can be expected to cause; classified between S0 (no injuries) and S3 (life-threatening injuries)), exposure (i.e., the relative expected frequency of the operational conditions in which the injury can occur; classified between E0 (incredibly unlikely) and E4 (high probability of injury under most operating conditions)), and controllability (i.e., the relative likelihood that the driver can act to prevent the injury; classified between C0 (controllable in general) and C3 difficult to control or uncontrollable)) of the vehicle operating scenario. As such, the safety goal(s) for any potential hazard event includes a set of ASIL requirements.

Hazards that are identified as quality management (QM) do not dictate any safety requirements. As an illustration, these QM hazards may be any combination of low probability of exposure to the hazard, low level of severity of potential injuries resulting from the hazard, and a high level of controllability by the driver in avoiding the hazard and/or preventing injuries. Other hazard events are classified as ASIL-A, ASIL-B, ASIL-C, or ASIL-D depending on the various levels of severity, exposure, and controllability corresponding to the potential hazard. ASIL-D events correspond to the highest integrity requirements (ASIL requirements) on the safety system or E/E components of the safety system, and ASIL-A comprises the lowest integrity requirements. As an example, the airbags, anti-lock brakes, and power steering system of a vehicle will typically have an ASIL-D grade, where the risks associated with the failure of these components (e.g., the probable severity of injury and lack of vehicle controllability to prevent those injuries) are relatively high.

As provided herein, the ASIL may refer to both risk and risk-dependent requirements, where the various combinations of severity, exposure, and controllability are quantified to form an expression of risk (e.g., an airbag system of a vehicle may have a relatively low exposure classification, but high values for severity and controllability). As provided above, the quantities for severity, exposure, and controllability for a given hazard are traditionally determined using values for severity (e.g., S0 through S3), exposure (e.g., E0 through E4), and controllability (e.g., C0 through C3) in the ISO 26262 series, where these values are then utilized to classify the ASIL requirements for the components of a particular safety system. As provided herein, certain safety systems can perform variable mitigation measures, which can range from alerts (e.g., visual, auditory, or haptic alerts), minor interventions (e.g., brake assist or steer assist), major interventions and/or avoidance maneuvering (e.g., taking over control of one or more control mechanisms, such as the steering, acceleration, or braking systems), and full autonomous control of the vehicle.

Current fully autonomous driving systems can comprise non-deterministic inference models, in which the system executes one or more perception, object detection, object classification, motion prediction, motion planning, and vehicle control techniques based on, for example, two-dimensional image data, to perform all autonomous driving tasks. It is contemplated that such implementations may be difficult or impossible to certify and provide an ASIL rating for the overall autonomous driving system. To address these shortcomings in current implementations, an autonomous driving system is provided herein that may perform deterministic, reflexive inference operations on specified hardware arrangements that allow for the certification and ASIL grading of various components, software aspects of the system, and/or the entire autonomous driving system itself.

In order to properly certify the system, the first option is to test, adapt (where necessary) and document the software in order to demonstrate compliance with the standard (see ISO 26262-8:2018, Clause 12). For a very large code base such as the Linux operating system, this is simply not a practical option. The second option is to develop an appropriate monitoring system for the operating system component. Therefore, through the use of runtime program verification, the software running the compute chiplets of the SoC architecture can be certified when they otherwise would not meet a required level of safety requirements (e.g., ASIL-D) without such runtime program verification.

In accordance with examples described herein, the use of a dual SoC arrangement in which each SoC in the pair alternates between primary and backup responsibilities can facilitate in the overall certification and ASIL grade of the autonomous driving system of the vehicle. In this arrangement, the first SoC and second SoC utilize isolated power sources and can be electrically coupled to each other by way of eFuses (e.g., active circuit protection devices with integrated field-effect transistors (FETs) used to limit currents and voltages to safe levels during fault conditions), which can further bolster the ASIL grade of the arrangement. The SoCs may have direct memory access to each other (e.g., via a functional safety component of each SoC), which can facilitate dynamic health monitoring, error checks, and seamless transitions between primary and backup status.

In certain implementations, the computing system can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

As further provided herein, an "autonomy map" or "autonomous driving map" comprises a ground truth map recorded by a mapping vehicle using various sensors (e.g., LIDAR sensors and/or a suite of cameras or other imaging devices) and labeled to indicate traffic and/or right-of-way rules at any given location. For example, a given autonomy map can be human labeled based on observed traffic signage, traffic signals, and lane markings in the ground truth map. In further examples, reference points or other points of interest may be further labeled on the autonomy map for additional assistance to the autonomous vehicle. Autonomous vehicles or self-driving vehicles may then utilize the labeled autonomy maps to perform localization, pose, change detection, and various other operations required for autonomous driving on public roads. For example, an autonomous vehicle can reference an autonomy map for determining the traffic rules (e.g., speed limit) at the vehicle's current location, and can dynamically compare live sensor data from an on-board sensor suite with a corresponding autonomy map to safely navigate along a current route.

Among other benefits, the examples described herein achieve a technical effect of providing redundancy and functional safety monitoring for SoCs to, for example, increase the safety integrity level of an autonomous vehicle computing system.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable media include permanent memory storage devices, such as hard drives on personal computers or servers. Other examples of computer storage media include portable storage units, such as flash memory or magnetic memory. Computers, terminals, network-enabled devices are all examples of machines and devices that utilize processors, memory, and instructions stored on computer-readable media. Additionally, examples may be implemented in the form of computer programs.

Example Computing System

FIG. 1 is a block diagram depicting an example computing system 100 in which embodiments described herein may be implemented, in accordance with examples described herein. In an embodiment, the computing system 100 can include one or more control circuits 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) 110 and/or computing system 100 may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when the control circuit(s) 110 or other hardware components execute the modules or computer-readable instructions.

In further embodiments, the computing system 100 can include a communication interface 140 that enables communications over one or more networks 150 to transmit and receive data. In various examples, the computing system 100 can communicate, over the one or more networks 150, with fleet vehicles using the communication interface 140 to receive sensor data and implement the intersection classification methods described throughout the present disclosure. In certain embodiments, the communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the control circuit(s) 110 of the computing system 100 can include a dual SoC arrangement that facilitates the various methods and techniques described throughout the present disclosure. In various examples, the SoCs can perform a set of tasks in a primary SoC and backup SoC arrangement, where the primary SoC performs the set of tasks, and the backup SoC maintains a standby state and monitors the status and/or state of the primary SoC. In various implementations, the set of tasks can comprise a set of autonomous driving tasks, such as perception, object detection and classification, grid occupancy determination, sensor data fusion and processing, motion prediction (e.g., of dynamic external entities), motion planning, and vehicle control tasks for autonomously operating a vehicle along a travel route. As described herein, multiple dual SoC arrangements may be implemented for performing these tasks, with each SoC pair being configured in the manner described in detail below.

System Description

Figure 2:
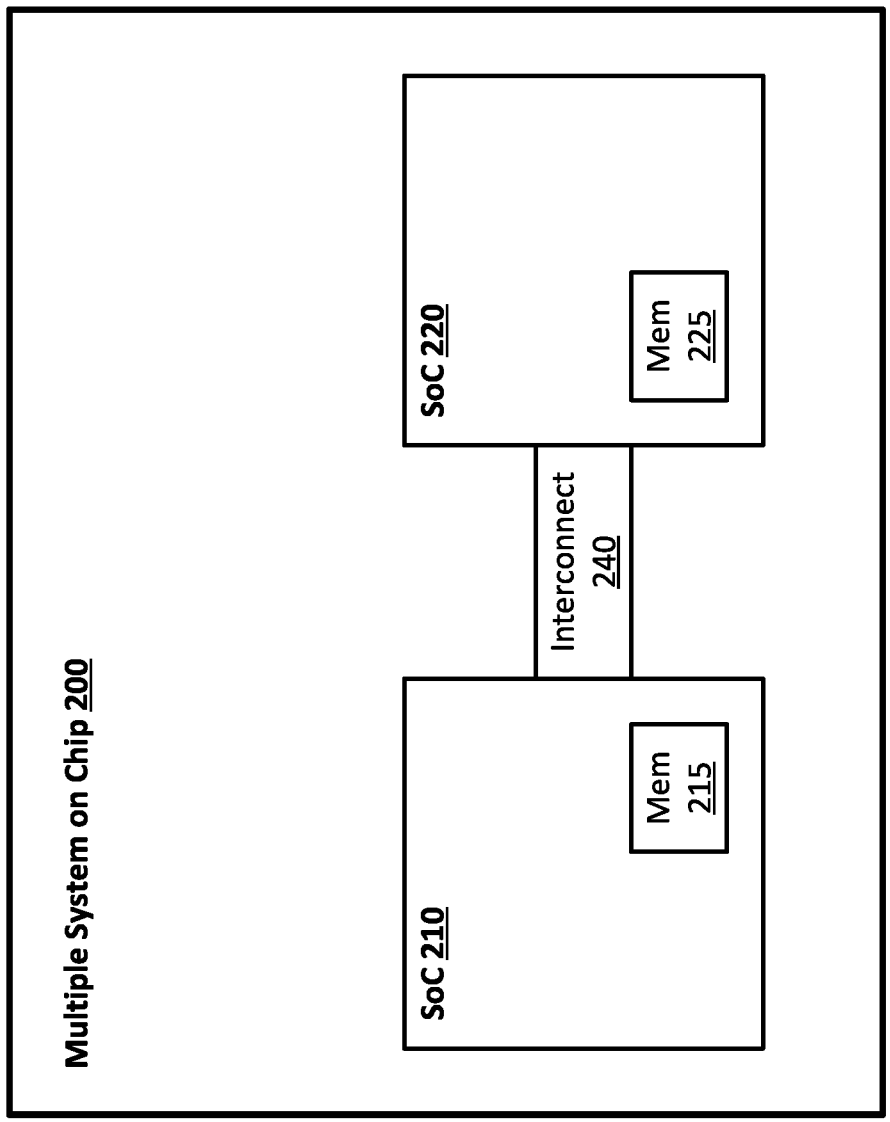
FIG. 2 is a block diagram depicting an example computing system implementing a multiple system-on-chip (SoC), in accordance with examples described herein.

FIG. 2 is a block diagram depicting an example multiple system on chip (MSoC), in accordance with examples described herein. In various examples, the MSoC 200 can include a first SoC 210 having a first memory 215 and a second SoC 220 having a second memory 225 coupled by an interconnect 240 (e.g., an ASIL-D rated chip-to-chip interconnect) that enables each of the first SoC 210 and second SoC 220 to read each other's memories 215, 225. During any given session, the first SoC 210 and the second SoC 220 may alternate roles, between a primary SoC and a backup SoC. As provided herein, the primary SoC can perform various autonomous driving tasks, such as perception, object detection and classification, grid occupancy determination, sensor data fusion and processing, motion prediction (e.g., of dynamic external entities), motion planning, and vehicle control tasks. The backup SoC can maintain a set of computational components (e.g., CPUs, ML accelerators, and/or memory chiplets) in a low power state, and continuously or periodically read the memory of the primary SoC.

For example, if the first SoC 210 is the primary SoC and the second SoC 220 is the backup SoC, then the first SoC 210 performs a set of autonomous driving tasks and publishes state information corresponding to these tasks in the first memory 215. The second SoC 220 reads the published state information in the first memory 215 to continuously check that the first SoC 210 is operating within nominal thresholds (e.g., temperature thresholds, voltage thresholds, bandwidth and/or memory thresholds, etc.), and that the first SoC 210 is performing the set of autonomous driving tasks free from error. In some examples, the nominal thresholds may be taken from manufacturers' specifications or determined through testing processes of the underlying hardware. As such, the second SoC 220 performs health monitoring (i.e., comparing recent values from the first SoC 210 to the nominal thresholds) and error management tasks for the first SoC 210 and takes over control of the set of autonomous driving tasks when a triggering condition is met. As provided herein, the triggering condition can correspond to a fault, failure, or other error experienced, such as exceeding one of the nominal thresholds, by the first SoC 210 that may affect the performance of the set of tasks by the first SoC 210.

In various implementations, the second SoC 220 can publish state information corresponding to its computational components being maintained in a standby state (e.g., a low power state in which the second SoC 220 maintains readiness to take over the set of tasks from the first SoC 210). In such examples, the first SoC 210 can monitor the state information of the second SoC 220 by continuously or periodically reading the memory 225 of the second SoC 220 to also perform health check monitoring and error management on the second SoC 220. For example, if the first SoC 210 detects a fault, failure, or other error in the second SoC 220, the first SoC 210 can trigger the second SoC 220 to perform a system reset or reboot.

In certain examples, the first SoC 210 and the second SoC 220 can each include a functional safety (FuSa) component that performs the health monitoring and error management tasks. The FuSa component can be maintained in a powered state for each SoC, whether the SoC operates in a primary or backup manner. As such, the backup SoC may maintain its other components in a low powered state, with its FuSa component being powered up and performing the heath monitoring and error management tasks described herein.

In various aspects, when the first SoC 210 operates as the primary SoC, the state information published in the first memory 215 can correspond to the set of tasks being performed by the first SoC 210. For example, the first SoC 210 can publish any information corresponding to the surrounding environment of the vehicle (e.g., any external entities identified by the first SoC 210, their locations, and predicted trajectories, detected objects, such as traffic signals, signage, lane markings, and crosswalk, and the like). The state information can further include the operating temperatures of the computational components of the first SoC 210, bandwidth usage and available memory of the chiplets of the first SoC 210, and/or any faults or errors, or information indicating faults or errors in these components.

In further aspects, when the second SoC 220 operates as the backup SoC, the state information published in the second memory 225 can correspond to the state of each computational component of the second SoC 220. In particular, these components may operate in a low power state in which the components are ready to take over the set of tasks being performed by the first SoC 210. The state information can include whether the components are operating within nominal temperatures and other nominal ranges (e.g., available bandwidth, power, memory, etc.).

As described throughout the present disclosure, the first SoC 210 and the second SoC 220 can switch between operating as the primary SoC and the backup SoC (e.g., each time the system 200 is rebooted). For example, in a computing session subsequent to a session in which the first SoC 210 operated as the primary SoC and the second SoC 220 operated as the backup SoC, the second SoC 220 can assume the role of the primary SoC and the first SoC 210 can assume the role of the backup SoC. It is contemplated that this process of switching roles between the two SoCs can provide substantially even wear of the hardware components of each SoC, which can prolong the lifespan of the computing system 200 as a whole.

It is contemplated that the MSoC arrangement of the computing system 200 can be provided to increase the safety integrity level (e.g., ASIL rating) of the computing system 200 and the overall autonomous driving system of the vehicle. As described herein, the autonomous driving system can include any number of dual SoC arrangements, each of which can perform a set of autonomous driving tasks. In doing so, the backup SoC dynamically monitors the health of the primary SoC in accordance with a set of functional safety operations, such that when a fault, failure, or other error is detected, the backup SoC can readily power up its components and take over the set of tasks from the primary SoC. Further description of the SoCs and their computational components is provided below with respect to FIG. 3.

Example SoC

Figure 3:
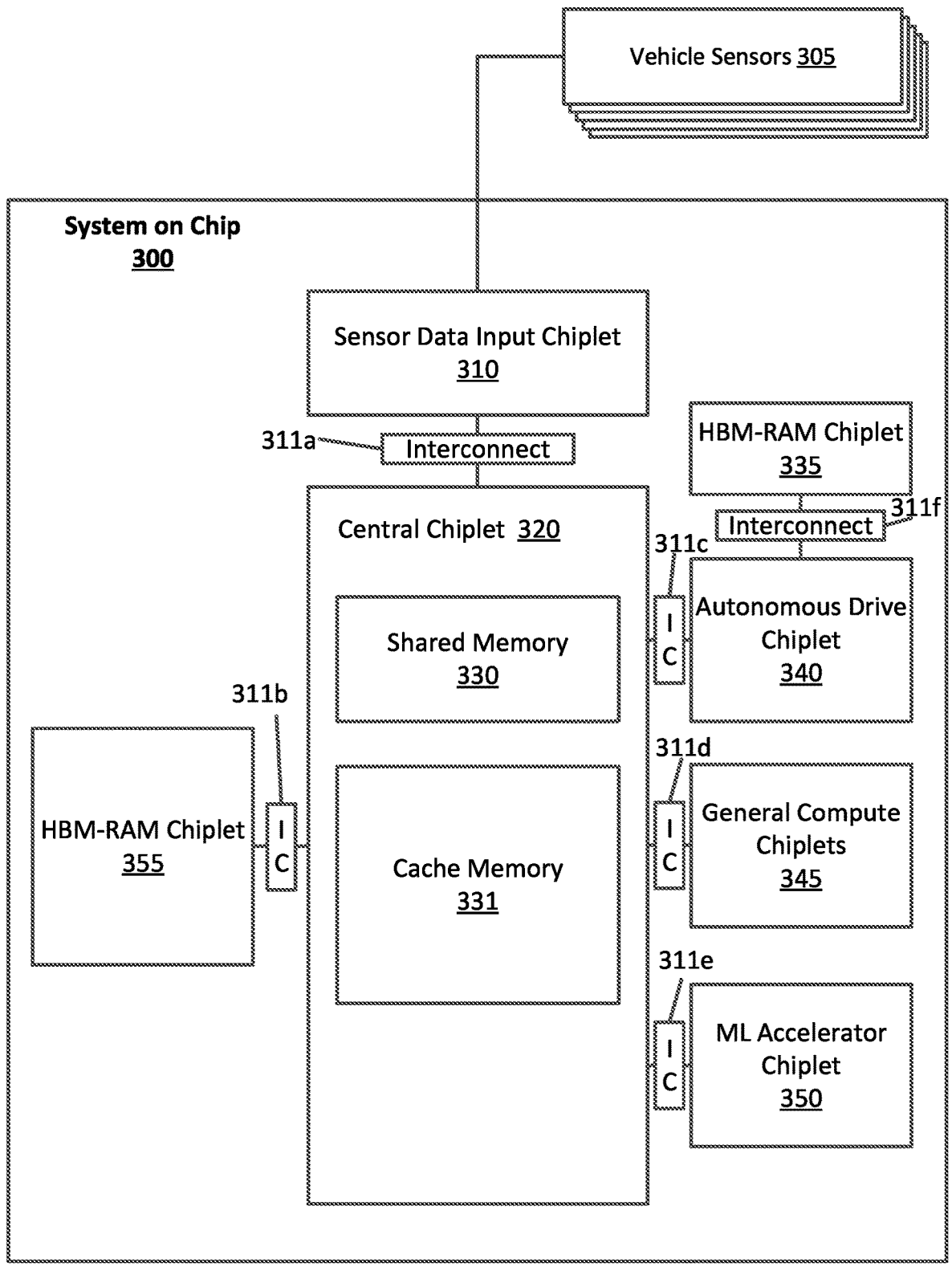
FIG. 3 is a block diagram depicting an example system on chip, in accordance with examples described herein.

FIG. 3 is a block diagram illustrating an example system on chip 300, in accordance with examples described herein. The system on chip 300 can comprise either the first SoC 210 or the second SoC 220 as shown and described in connection with FIG. 2. Furthermore, the example system on chip 300 shown in FIG. 3 can include additional components, and the components of system on chip 300 may be arranged in various alternative configurations other than the example shown. Thus, the system on chip 300 of FIG. 3 is described herein as an example arrangement for illustrative purposes and is not intended to limit the scope of the present disclosure in any manner.

Referring to FIG. 3, a sensor data input chiplet 310 of the system on chip 300 can receive sensor data from various vehicle sensors 305 of the vehicle. These vehicle sensors 305 can include any combination of image sensors (e.g., single cameras, binocular cameras, fisheye lens cameras, etc.), LIDAR sensors, radar sensors, ultrasonic sensors, proximity sensors, and the like. The sensor data input chiplet 310 can automatically dump the received sensor data as it's received into a cache memory 331 of the central chiplet 320. The sensor data input chiplet 310 can also include an image signal processor (ISP) responsible for capturing, processing, and enhancing images taken from the various vehicle sensors 305. The ISP takes the raw image data and performs a series of complex image processing operations, such as color, contrast, and brightness correction, noise reduction, and image enhancement, to create a higher-quality image that is ready for further processing or analysis by the other chiplets of the SoC 300. The ISP may also include features such as auto-focus, image stabilization, and advanced scene recognition to further enhance the quality of the captured images. The ISP can then store the higher-quality images in the cache memory 331.

In some aspects, the sensor data input chiplet 310 publishes identifying information for each item of sensor data (e.g., images, point cloud maps, etc.) to a shared memory 330 of a central chiplet 320, which acts as a central mailbox for synchronizing workloads for the various chiplets. The identifying information can include details such as an address in the cache memory 331 where the data is stored, the type of sensor data, which sensor captured the data, and a timestamp of when the data was captured.

To communicate with the central chiplet 320, the sensor data input chiplet 310 transmits data through an interconnect 311a. Interconnects 311a-f each represent die-to-die (D2D) interfaces between the chiplets of the SoC 300. In some aspects, the interconnects include a high-bandwidth data path used for general data purposes to the cache memory 331 and a high-reliability data path to transmit functional safety and scheduler information to the shared memory 330. Network on chip (NoC) network interface units (NIU) on the chiplets can be configured to generate error-correcting code (ECC) data on both the high-bandwidth and high-reliability data paths. Each corresponding NIU on its pairing die has the same ECC configuration, which generates and checks the ECC data to ensure end to end error correction coverage. For the high-reliability data paths, the NIUs can transmit the functional safety and scheduler information in two redundant transactions, with the second transaction ordering the bits in reverse (e.g., from bit 31 to 0 on a 32-bit bus) of the order of the first transaction. Furthermore, if errors are detected in the data transfers between chiplets on the high-reliability data path, the NIUs can reduce the transmission rate to improve reliability.

Depending on bandwidth requirements, an interconnect may include more than one die-to-die interface. For example, interconnect 311a can include two interfaces to support higher bandwidth communications between the sensor data input chiplet 310 and the central chiplet 320.

In one aspect, the interconnects 311a-f implement the Universal Chiplet Interconnect Express (UCIe) standard and communicate through an indirect mode to allow each of the chiplet host processors to access remote memory as if it were local memory. This is achieved by using specialized NoC NIUs that provide hardware-level support for remote direct memory access (RDMA) operations. These NIUs also allow for freedom from interference between devices connected to the network. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the system on chip 300 can include additional chiplets that can store, alter, or otherwise process the sensor data cached by the sensor data input chiplet 310. The system on chip 300 can include an autonomous drive chiplet 340 that can perform operations to determine the physical characteristics of the environment around the sensors. These operations can include perception, sensor fusion, trajectory prediction, and/or other autonomous driving algorithms of an autonomous vehicle. To perform these operations, the autonomous drive chiplet 340 can include specialized hardware such as digital signal processors (DSP), a direct memory access (DMA) engine, and neural network (NN) accelerators. The autonomous drive chiplet 340 can be connected to a dedicated HBM-RAM chiplet 335 in which the autonomous drive chiplet 340 can publish all status information, variables, statistical information, and/or processed sensor data as processed by the autonomous drive chiplet 340.

In various examples, the system on chip 300 can further include a machine-learning (ML) accelerator chiplet 340 that is specialized for accelerating AI workloads, such as image inferences or other sensor inferences using machine learning, in order to achieve high performance and low power consumption for these workloads. The ML accelerator chiplet 340 can include an engine designed to efficiently process graph-based data structures, which are commonly used in AI workloads, and a highly parallel processor, allowing for efficient processing of large volumes of data. The ML accelerator chiplet 340 can also include specialized hardware accelerators for common AI operations such as matrix multiplication and convolution as well as a memory hierarchy designed to optimize memory access for AI workloads, which often have complex memory access patterns.

The general compute chiplets 345 can provide general purpose computing for the system on chip 300. For example, the general compute chiplets 345 can comprise high-powered central processing units and/or graphical processing units that can support the computing tasks of the central chiplet 320, autonomous drive chiplet 340, and/or the ML accelerator chiplet 350.

In various implementations, the shared memory 330 can store programs and instructions for performing autonomous driving tasks. The shared memory 330 of the central chiplet 320 can further include a reservation table that provides the various chiplets with the information needed (e.g., sensor data items and their locations in memory) for performing their individual tasks. Further description of the shared memory 330 in the context of the dual SoC arrangements described herein is provided below with respect to FIG. 4. The central chiplet 320 also includes the large cache memory 331, which supports invalidate and flush operations for stored data.

Cache miss and evictions from the cache memory 331 are sent by a high-bandwidth memory (HBM) RAM chiplet 355 connected to the central chiplet 320. The HBM-RAM chiplet 355 can include status information, variables, statistical information, and/or sensor data for all other chiplets. In certain examples, the information stored in the HBM-RAM chiplet 355 can be stored for a predetermined period of time (e.g., ten seconds) before deleting or otherwise flushing the data. For example, when a fault occurs on the autonomous vehicle, the information stored in the HBM-RAM chiplet 355 can include all information necessary to diagnose and resolve the fault. Cache memory 331 keeps fresh data available with low latency and less power required compared to accessing data from the HBM-RAM chiplet 355.

Figure 4:
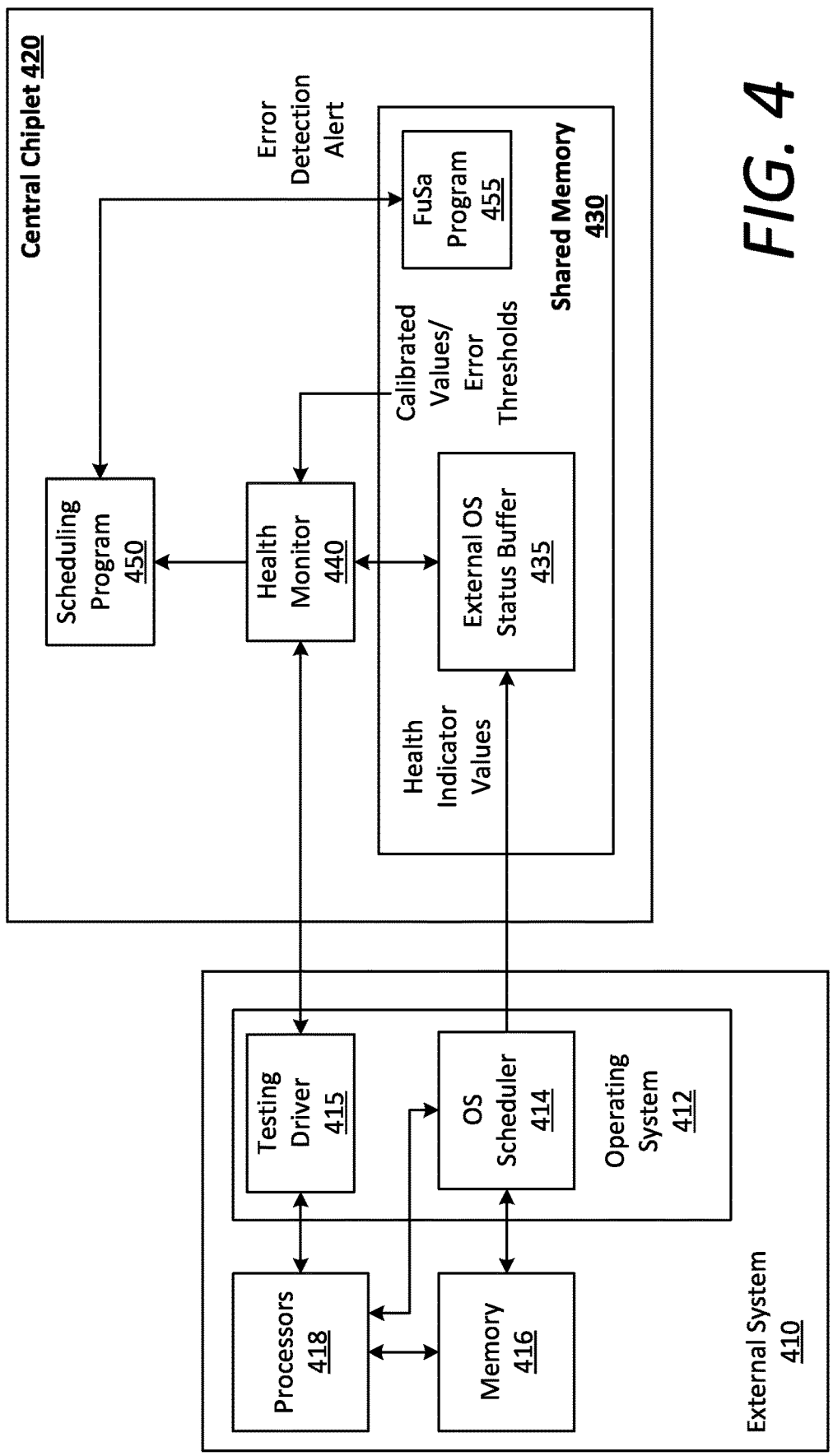
FIG. 4 is a block diagram depicting an example external system and a central chiplet with a health monitor, according to examples described herein.

FIG. 4 is a block diagram depicting an example external system and a central chiplet with a health monitor. In various implementations, a health monitor 440 on a central chiplet 420 receives recent values for a set of system health indicators for an external system 410. The recent values are compared to calibrated values for the set of system health indicators, and normal operation of the external system 440 is verified based on whether the comparison of the recent values to the calibrated values are within predetermined error thresholds. In some examples, the external system 410 is one of the general compute chiplets 345 as described in context with FIG. 3.

In the external system 410, the operating system 412 acts as an intermediary between the hardware components, such as the memory 416 and the processors 412. The operating system 412 handles memory management tasks like allocating and deallocating memory, managing virtual memory, and implementing memory protection mechanisms to prevent unauthorized access. The memory management aspect involves various software components such as the stack, heap, and operating system-managed memory. The stack is a region of memory used for managing function calls, local variables, and storing return addresses. The operating system 412 maintains a stack pointer, which keeps track of the current position within the stack. It ensures proper stack frame creation and destruction during function calls. On the other hand, the heap is a dynamically allocated memory region used for managing dynamic memory requests made by processes executing on the external system 410. The operating system 412 facilitates heap allocation by providing system calls or memory management functions that allow these processes to request and release memory blocks on the heap.

Similarly, the operating system 412 manages the processors 418 by scheduling and allocating their resources to different processes. It ensures fairness and efficiency by employing scheduling algorithms to determine which processes receive CPU time, switching between them through context switching, and providing mechanisms for process synchronization and intercommunication through the use of an operating system (OS) scheduler 414. When a process exhausts its allocated CPU time slice or voluntarily relinquishes its use of one of the processors 418, the OS scheduler 414 initiates a context switch. During this switch, the OS scheduler 414 saves the current process's context, including register values program counters, onto its process control block (PCB). It then selects the next process to run from the scheduling queue, restores its context from its PCB, and transfers control to it. This process switching is achieved through a combination of hardware support (such as the context-switching instructions provided by the processors 418) and the scheduler's management of the scheduling queues and process states.

In some aspects, the OS scheduler 414 includes functionality to report values for a set of health indicators to a separate system, such as the central chiplet 420. In one example, each time the OS scheduler 414 context switches from a first program to a second program, the OS scheduler 414 determines values for at least some of the set of health indicators for the first program and transmits those values to the central chiplet 420. The health indicators are selected metrics that, when compared with predetermined calibrated values or input into a trained machine learning model, can indicate normal or abnormal operation of the software and hardware components of the external system 410. These health indicators can include the amount of memory allocated, program runtime, stack pointer changes, and heap values for the first program.

In one aspect, the central chiplet 420 stores the values for the set of health indicators in an external OS status buffer 435 within the shared memory 430. In addition to the values for each set of health indicators, the buffer can include identifying metadata such as the source of the values (i.e., external system 410), the program or process associated with the values (i.e., a process ID), a timestamp of when the values were recorded, etc.

In one example, the health monitor 440 reads the health indicator values from the external OS status buffer 435 on a regular schedule. The health monitor 440 then compares each of the values to their corresponding calibrated values to determine whether the software and hardware of the external system 410 is functioning properly. If the comparison indicates that the health indicator values are each within the error thresholds, then the health monitor 440 has verified normal operation of the external system 410. However, if the comparison indicates that one or more of the health indicator values deviates from its calibrated value by more than the allowed error threshold, the health monitor 440 can determine that the external system 410 is not performing normally. For example, the health monitor 440 may detect that a program on the external system 410 is using more memory than normal, taking longer to execute than normal, or that its stack or heap pointers are behaving erratically compared to the calibrated values.

In some aspects, the calibrated values and error thresholds are predetermined values that are loaded and stored in the shared memory 430. The calibrated values can be determined by rigorous testing of the external system 410 hardware and software (e.g., at a factory prior to sale of the system to customers). The error thresholds can similarly be determined through testing and manufacturer guidelines (e.g., temperature and voltage guidelines for the processor 418, such as not exceeding 100 degrees Celsius or 1.5 volts at a site where a probe is located).

In one implementation, the calibrated values are determined by a machine learning model trained through a machine learning process. For example, a labeled dataset that includes examples of both normal and abnormal behavior can be prepared that covers a broad range of potential anomalies that may occur in the external system 410. A machine learning model (e.g., a support vector machine, autoencoder, Bayesian network, etc.) can be trained using the labeled dataset to learn patterns and characteristics of normal behavior of the components of the external system 410. Accordingly, the calibrated values comprise the patterns and characteristics of normal behavior learned by the model. Prior to deployment, the performance of the trained model can be assessed using evaluation metrics such as precision, recall, F1-score, area under the receiver operating characteristic curve, etc.

Once deployed as part of the health monitor 440, the machine learning model uses the recent values, in combination with the patterns and characteristics of normal behavior (i.e., the calibrated values) determined during the training process, to verify normal operation of the external system. For example, the recent values may be input into the model to detect anomalies (i.e., unusual values or events that deviate from normal operation) that would indicate abnormal operation. In some aspects, the model's predication scores or an analysis of the distribution of normal and abnormal instances is used to determine the error thresholds that delineate the difference between normal and abnormal operation of the external system 410.

In addition or as an alternative, the external system 410 operating system 412 includes a testing driver 415 to execute a testing program on the processors 418. In one example, the testing program runs a demanding test task on the processors 418 in order to stress the processors 418 to determine whether the processors 418 are capable of correct operation when under heavy load. The testing program can read voltage and temperature values from probes placed on the processors 418. The testing driver 415 reports these values back to the health monitor 440 (which may store the values in the external OS status buffer 435), which can then compare the values to calibrated values and error thresholds to determine the status of the processors 418. The status can include information such as whether the processors 418 are in working order and a prediction on the useful life remaining on the processors 418 before they have degraded to a state that may create a safety concern.

In some examples, the health monitor 440 can detect software faults or bugs, though the comparison of the health indicator values to the calibrated values can also determine whether a program on the external system 410 has been tampered with. For example, malicious code injected into one of the programs running on the operating system 412 of the external system 410 may result in that program's runtime execution taking longer than the calibrated value for that program's runtime, using more memory, or otherwise manipulating stack pointer and register values in an unexpected way, which the health monitor 440 can detect.

In some aspects, upon determining that the comparison of the recent values to the calibrated values are outside the predetermined error thresholds, the health monitor 440 alerts a functional safety program 455 in the shared memory 430 of the central chiplet 420. The health monitor 440 can transmit an error detection alert through the scheduling program 450 to the functional safety program 455, which can trigger one or more remedial actions in response. In one example, the remedial action is to switch the primary system on chip to a backup system on chip in a multiple system on chip architecture (see FIG. 2) to control an autonomous vehicle.

Figure 5:
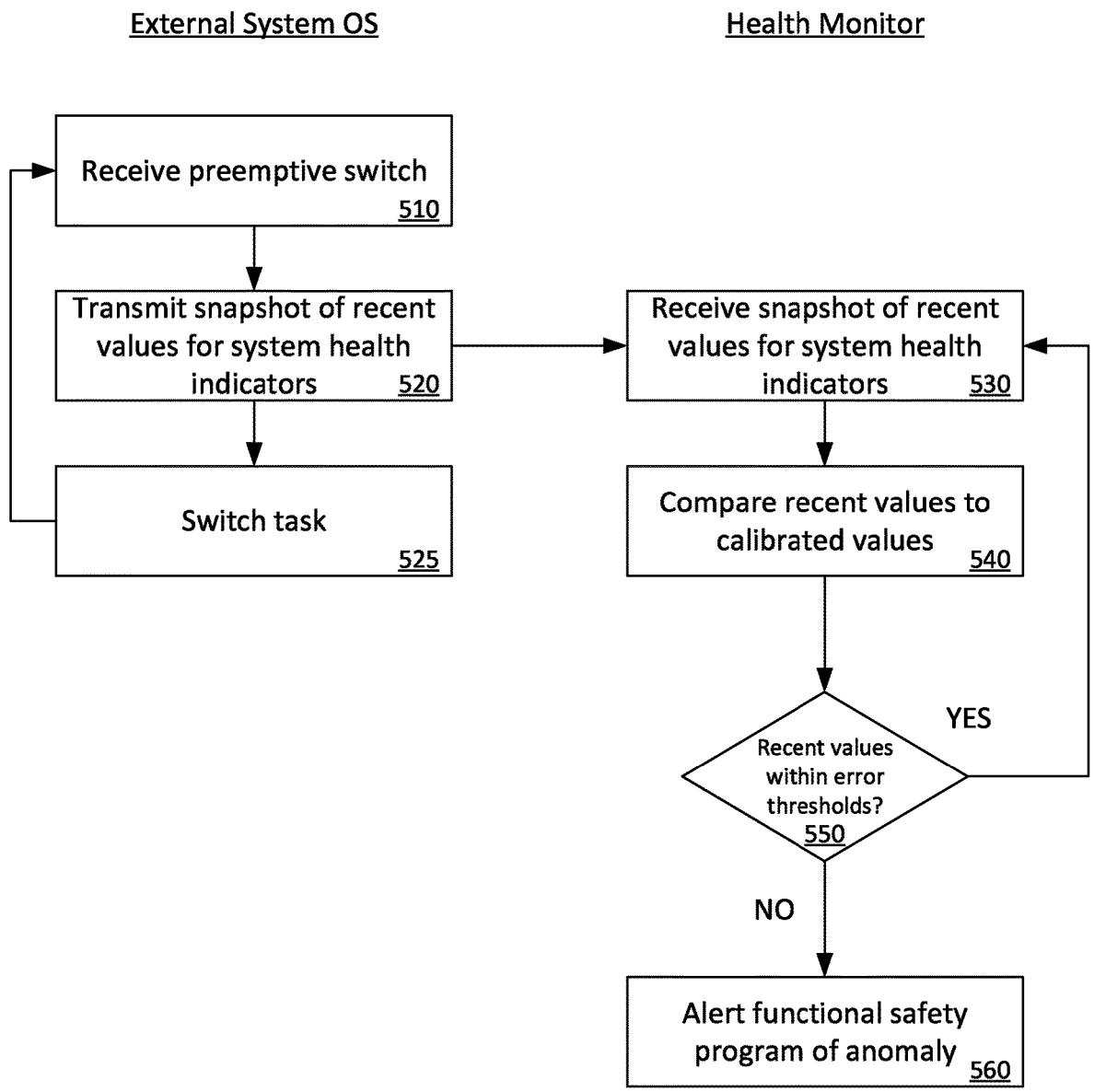
FIG. 5 is a flow chart describing a method of verifying normal operation of an external system, according to examples described herein.

FIG. 5 is a flow chart describing a method of verifying normal operation of an external system.

During operation of the external system operating system, the scheduler receives a preemptive switch (510). The external system operating system transmits a snapshot of recent values for system health indicators of the external system (520). The operating system scheduler then switches tasks (525). A health monitor running on a separate system (e.g., a separate chiplet within a system on chip architecture) receives the snapshot of the recent values for the system health indicators sent from the external system (530). In some aspects, the health monitor compares the recent values for each of the system health indicators to stored calibrated values (540). The health monitor verifies normal operation of the external system by determining whether each of the recent values is within an error threshold of the calibrated values (550). If the comparison of one of the recent values to its calibrated value is determined to be outside its predetermined error threshold, the health monitor can alert a functional safety program (560).

It is contemplated for examples described herein to extend to individual elements and concepts described herein, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A method of runtime program verification, the method being implemented by one or more processors and comprising: receiving, over a chip-to-chip interconnect with an external system, context data generated through a preemptive mechanism of an operating system running on the external system, the preemptive mechanism managing allocation of hardware and software resources amongst multiple processes running on the external system, the context data including a set of metrics that are indicative of a respective state of a set of resources allocated to individual processes running on the external system when the individual processes exhaust their allocated set of resources; comparing the set of metrics to a set of calibrated values for the set of metrics; and verifying normal operation of the external system based on the comparison of set of metrics to the set of calibrated values.

2. The method of claim 1, further comprising:
upon determining that the comparison of the set of metrics to the set of calibrated values are outside predetermined error thresholds, alerting a functional safety program.

3. The method of claim 2, wherein the functional safety program switches to a backup system for the external system.

4. The method of claim 1, wherein the set of calibrated values are determined by a machine learning model trained through a machine learning process.

5. The method of claim 4, wherein the machine learning model uses the set of metrics to verify normal operation of the external system.

6. The method of claim 1, further comprising:
executing a testing program on one or more processors of the external system to determine a corresponding set of values for comparison with the set of calibrated values, wherein the testing program is executed on a predetermined schedule.

7. The method of claim 1, wherein for an individual process that exhausts its allocated set of resources when running on the external system, the set of metrics indicate at least one of an amount of memory allocated to the process, a program runtime of the process, stack pointer changes made by the process, and or heap values for the process.

8. The method of claim 1, wherein the one or more processors are part of a first chiplet and the external system is a second chiplet connected to the first chiplet in a system on chip arrangement.

9. The method of claim 8, wherein the system on chip is configured for performing autonomous driving.

10. The method of claim 1, wherein the preemptive mechanism is implemented by a scheduler of the operating system.

11. The method of claim 1, wherein the external system does not meet a required level of safety requirements without runtime program verification.

12. A computer monitoring system comprising: a memory resource storing instructions; and one or more processors using the instructions stored in the memory resource to perform operations including: receiving, over a chip-to-chip interconnect with an external system, context data generated through a preemptive mechanism of an operating system running on an external system, the preemptive mechanism managing allocation of hardware and software resources amongst multiple processes running on the external system, the context data including a set of metrics that are indicative of a respective state of a set of resources allocated to individual processes running on the external system when the individual processes exhaust their allocated set of resources; comparing the set of metrics to a set of calibrated values for the set of metrics; and verifying normal operation of the external system based on the comparison of the set of metrics to the set of calibrated values.

13. The computer monitoring system of claim 12, wherein the one or more processors perform further operations including:
upon determining that the comparison of the set of metrics to the set of calibrated values are outside the predetermined error thresholds, alerting a functional safety program.

14. The computer monitoring system of claim 13, wherein the functional safety program switches to a backup system for the external system.

15. The computer monitoring system of claim 12, wherein the one or more processors perform further operations including:
executing a testing program on one or more processors of the external system to determine a corresponding set of values for comparison to the set of calibrated values, wherein the testing program is executed on a predetermined schedule.

16. The computer monitoring system of claim 12, wherein for an individual process that exhausts its allocated set of resources when running on the external system, the set of metrics indicate at least one of an amount of memory allocated to the process, a program runtime of the process, stack pointer changes made by the process, or heap values for the process.

17. The computer monitoring system of claim 12, wherein one or more processors are part of a first chiplet and the external system is a second chiplet connected to the first chiplet in a system on chip arrangement.

18. The computer monitoring system of claim 12, wherein the external system does not meet a required level of safety requirements without runtime program verification.

19. A non-transitory computer readable medium storing instructions that, when executed by one or more processors of a computing system, cause the computing system to: receive, over a chip-to-chip interconnect with an external system, context data generated through a preemptive mechanism of an operating system running on an external system, the preemptive mechanism managing allocation of hardware and software resources amongst multiple processes running on the external system, the context data including a set of metrics that are indicative of a respective state of a set of resources allocated to individual processes running on the external system when the individual processes exhaust their allocated set of resources; compare the set of metrics to a set of calibrated values for the set of metrics; and verify normal operation of the external system based on the comparison of the set of metrics to the set of calibrated values.

20. The non-transitory computer readable medium of claim 19 storing further instructions to:
upon determining that the comparison of the set of metrics to the set of calibrated values are outside predetermined error thresholds, alert a functional safety program.

* * * * *